United States Patent [19]

Holker et al.

[11] 4,367,327

[45] Jan. 4, 1983

[54] BREATHABLE, NON-POROUS POLYURETHANE FILM PREPARED FROM A LOW MOLECULAR WEIGHT DIFUNCTIONAL COMPOUND, A POLYETHYLENE GLYCOL AND A DIISOCYANATE

[75] Inventors: James R. Holker, Sale; Roy Jeffries, Cheadle Hulme; George R. Lomax, Wincham, all of England

[73] Assignee: Shirley Institute, Manchester, England

[21] Appl. No.: 285,685

[22] Filed: Jul. 21, 1981

[30] Foreign Application Priority Data

Nov. 22, 1980 [GB] United Kingdom ............... 8037510

[51] Int. Cl.³ ............................................ C08G 18/32
[52] U.S. Cl. .................................. 528/61; 428/423.1; 528/66; 528/67; 528/76; 528/904
[58] Field of Search ................... 528/61, 66, 67, 76, 528/904; 428/423.1

[56] References Cited

U.S. PATENT DOCUMENTS 3,607,822  9/1971  Nishino ............................. 528/66
4,202,880  5/1980  Fildes et al. ........................ 528/76

*Primary Examiner*—Maurice J. Welsh
*Attorney, Agent, or Firm*—Alan H. Levine

[57] ABSTRACT

Clothing weatherproofed by being coated with plastics material of low permeability to water vapor is uncomfortable to wear.

The present invention provides a breathable polyurethane film for coating on fabrics to make them waterproof. The film comprises a hard segment formed by reaction of a low molecular weight difunctional compound with excess diisocyanate to form a prepolymer and a soft segment provided by polyethylene glycol with which the prepolymer is reacted in a stoichiometric amount. If desired the film can be formed by reacting the polyethylene glycol with excess diisocyanate to form a prepolymer which is then reacted with a stoichiometric amount of a low molecular weight difunctional compound. The mechanical properties of the film can be improved by cross linking with a cross linking agent such as a triisocyanate.

24 Claims, No Drawings

BREATHABLE, NON-POROUS POLYURETHANE FILM PREPARED FROM A LOW MOLECULAR WEIGHT DIFUNCTIONAL COMPOUND, A POLYETHYLENE GLYCOL AND A DIISOCYANATE

This invention relates to polyurethane films and more particularly polyurethane films which have the property of breathability, i.e. the ability to transmit water vapour, similar to that of textile fabrics, but which are not porous.

According to the present invention there is provided a breathable, non-porous polyurethane film being a block co-polymer of a low molecular weight difunctional compound, to provide hard segments in the film, a polyethylene glycol to provide soft segments in the film and a diisocyanate, the polyethylene glycol being present in the amount of from 25 to 45% by weight based on the total weight of the film forming constituents.

According to one aspect of the present invention there is provided a breathable, non-porous polyurethane film produced by reacting a low molecular weight difunctional compound with an excess of a diisocyanate to form a prepolymer and subsequently reacting the prepolymer with the stoichiometric amount of a polyethylene glycol, the low molecular weight difunctional compound being one which provides a hard segment in the film and the polyethylene glycol being one which provides a soft segment in the film, polyethylene glycol being present in the amount of from 25 to 45% by weight based on the total weight of the reaction mixture.

According to another aspect of the present invention there is provided a breathable, non-porous polyurethane film produced by reacting a polyethylene glycol with an excess of a diisocyanate to form a prepolymer and subsequently reacting the prepolymer with the stoichiometric amount of a low molecular weight difunctional compound, the low molecular weight difunctional compound being one which provides a hard segment in the film and the polyethylene glycol being one which provides a soft segment in the film, polyethylene glycol being present in the amount of from 25 to 45% by weight based on the total weight of the reaction mixture.

Although the sequential reaction of the constituents as described above is preferred, it is possible, if the reactivity of the low molecular weight difunctional compound is different to that of the polyethylene glycol, to react the constituents together. If the reactivity of the difunctional compound and the polyethylene glycol is similar then the discrete block structure as obtained by the successive reaction, may not result.

The hard segment in the film provides the required mechanical properties of strength and toughness.

The low molecular weight difunctional compounds include straight or branch chain aliphatic compounds, cyclic compounds and aromatic compounds in which the functional groups are of substantially equal reactivity. Examples of low molecular weight difunctional compounds which can be used include diols such as ethylene glycol, diethylene glycol, triethylene glycol, 1,4-butanediol, thiodiglycol, 2,2-dimethyl propane-1,3-diol, 1,4-bishydroxymethylbenzene, bis-hydroxyethyl disulphide, cyclohexanedimethanol; diamines such as ethylene diamine; dihydrazides such as carbodithydrazide oxalic hydrazide, hydrazine, substituted hydrazines.

With increasing molecular weight the hardness of the hard segment is reduced. It is, therefore, preferred not to use a difunctional compound for the hard segment having a molecular weight in excess of 200. The hard segment may be formed from a single low molecular weight difunctional compound or from a mixture of two or more such compounds.

If desired the hard segment may be formed by reaction, preferably sequentially, of excess diisocyanate with two or more low molecular weight difunctional compounds, the resulting prepolymer being thereafter reacted with polyethylene glycol in accordance with the invention. By appropriate selection of the materials forming the hard segment and of the proportions thereof it is possible to adjust the mechanical properties as may be required to meet a particular purpose.

The soft segment gives flexibility and hydrophilic properties to the film and contributes directly to its ability to transmit water vapour. The soft segment is formed from a polyethylene glycol, preferably polyethylene glycol having an average molecular weight above 400. At high average molecular weights of polyethylene glycol the resultant product has poor mechanical properties and for that reason it is preferred not to exceed an average molecular weight of 2000. Good results are obtained using polyethylene glycol having an average molecular weight of from 400 and 1500 more particularly of from 600 to 1000.

The proportion of polyethylene glycol in the composition must be within the range 25 to 45% by weight based on the total weight of the reaction mixture, if breathability is to be obtained. Preferably the proportion of polyethylene glycol in the composition is from 30 to 40%. The amount of polyethylene glycol included in the composition depends, inter alia, on the desired properties of the product and also on the average molecular weight of the polyethylene glycol used. At lower molecular weights a higher proportion of polyethylene glycol is required to achieve the same breathability as can be obtained with less polyethylene glycol of higher molecular weight. Mixtures of polyethylene glycols of different average molecular weights can be used if desired.

The diisocyanate may be any of those generally used for forming polyurethanes. Preferred, however, is 4,4'-diisocyanatodicyclohexylmethane.

The film-forming polymers prepared according to the invention may be used with advantage as a coating for fabrics or as fabrics per se or as garment per se. The fabrics or garments of the invention or fabrics using the invention as a coating have many applications. For example they can be used for clothing or parts of clothing, for medical purposes such as wound dressings or sanitary wear, for tents or sports equipment, as membranes for scientific purposes. Being breathable, such fabrics can be worn without the discomfort commonly encountered with films, or fabrics coated with films, of plastic material having low permeability to water-vapour. In addition to adjustment of mechanical properties by altering the nature and proportion of the hard segment it is also possible to improve the strength of the film by cross-linking in a manner known per se, for example by addition of a cross-linking agent, such as a triisocyanate, to a solution of the polymer before casting the film, which is then dried and cured under suitable conditions.

The following Examples further illustrate the invention.

EXAMPLE 1

Diethylene glycol (34.8 g, 0.33 mol) in methylene chloride (150 ml) was added slowly during 1.5 hr to a stirred solution of 4,4'diisocyanatodicyclohexylmethane (Hylene W) (107.5 g, 0.41 mol) and dibutyltin dilaurate (Mellite 12, 1.2 g) in methylene chloride (100 ml) at room temperature. The mixture was stirred for a further one hour to allow the isocyanate content to reach a constant value, and then treated during 2 hr with polyethylene glycol, M.W. 1000 (Found, 940) (77.1 g, 0.082 mol) in methylene chloride (200 ml). The reaction was allowed to run overnight, then heated to 40° C. for 2 hr with vigorous stirring. An infrared spectrum at this stage revealed some residual isocyanate, which was removed by addition of diethylamine (1 ml). A film cast from an appropriately concentrated (ca 25% w/w) solution of the resulting polymer B(i) (Table 1) had a strength of 12140 kN/m$^2$, elongation 404%, and an intrinsic water vapour permeability* (Turl dish method) of 382 g.mm/m$^2$/24 hr.

*Calculated rate of transmission for a 1 mm thick film.

Cross-linking was effected by addition of a triisocyanate (75% Imprafix TH solution, 6 g) and appropriate catalyst (Imprafix BE solution, 6 g) to a 35% w/w solution (150 g) of the polymer in methylene chloride: cellosolve acetate (10:1) and curing the dried, cast film at 90° C. for 8 min. The resulting film, Bii, (Table 1) had a strength of 29800 kN/m$^2$, elongation 267%, and intrinsic water vapour permeability 75 g.mm/m$^2$/24 hr.

Other polymers prepared by this method include A, D, E, and I–L in Table 1.

EXAMPLE 2

A prepolymer was prepared as in Example 1 from Hylene W and diethylene glycol in the molar ratio 2:1.8. Additional Hylene W was then added to bring the overall diisocyanate:diol ratio to 2:1.6 and polymerisation was completed by reaction with polyethylene glycol, M.W. 1000. A film of the final polymer, C(i) had a strength of only 7600 kN/m$^2$ and a water vapour permeability greater than 500 g.mm/m$^2$/24 hr. When cross-linked with 5% w/w of Imprafix TH, the film, C(ii), increased in strength to 26100 kN/m$^2$, with an elongation of 395%; intrinsic water vapour permeability was 247 g.mm/m$^2$/24 hr.

EXAMPLE 3

A prepolymer was prepared as in the previous examples containing Hylene W, diethylene glycol, and polyethylene glycol, M.W. 1000, in the molar ratio 2:1.3:0.4. Further treatment of this prepolymer with the stoichiometric amount of ethylene diamine at room temperature afforded a polymer, F, with a film strength of 16900 kN/m$^2$, elongation 587%, and intrinsic water vapour permeability 612 g.mm/m$^2$/24 hr.

Polymers G and H (Table 1) were also prepared by this method, with ethylenediamine and ethylene glycol respectively as the final extender. When ethylene diamine was used as the final extender, no catalyst was added at the cross-linking stage.

TABLE 1

| Polymer | PEG content (% w/w) | Cross-linking agent | (% w/w) | Breaking load (MN/m$^2$) | Elongation (%) | P$_w$ (g.mm/m$^2$/day) |
|---|---|---|---|---|---|---|
| PEG 600 | | | | | | |
| A | 44.4 | (i) | — | 3.3 | — | 489 |
| | | (ii) | 20 | 22.7 | 325 | 131 |
| PEG 1000 | | | | | | |
| B | 36.6 | (i) | — | 12.1 | 404 | 382 |
| | | (ii) | 7.5 | 29.8 | 267 | 75 |
| C | 36.6 | (i) | — | 7.6 | — | >500 |
| | | (ii) | 5 | 26.1 | 395 | 247 |
| D | 36.1 | | — | 2.3 | 303 | 971, 738 |
| E | 35.7 | | — | 4.7 | 556 | 873 |
| F | 36.3 | | — | 13.4 | 747 | 661 |
| G | 36.9 | (i) | — | 27.0 | 650 | 348 |
| | | (ii) | 5 | 40.2 | 605 | 268 |
| | | (iii) | 10 | 31.3 | 496 | 100 |
| H | 36.9 | (i) | — | 8.2 | 807 | 220 |
| | | (ii) | 5 | 23.5 | 524 | 223 |
| I | 29.9 | (i) | — | 13.3 | 319 | 363 |
| | | (ii) | 2.5 | 27.4 | 268 | 140 |
| J | 26.1 | (i) | — | 16.7 | 189 | 92 |
| | | (ii) | 7.5 | 20.5 | 197 | 59 |
| PEG 2000 | | | | | | |
| K | 46.0 | | — | 4.4 | 181 | >1000 |
| L | 35.9 | | — | 8.5 | 330 | 686 |

MOLAR COMPOSITION OF FILM-FORMING POLYMERS IN TABLE 1

A: 2 Hylene W:1.14 DEG:0.86 PEG 600
B: 2 Hylene W:1.6 DEG:0.4 PEG 1000
C: 2 Hylene W:1.6 DEG:0.4 PEG 1000
D: 2 Hylene W:0.8 DEG+0.8 TDG:0.4 PEG 1000*
E: 2 Hylene W:1.6 TDG:0.4 PEG 1000
F: 2 Hylene W:1.3 TDG:0.4 PEG 1000:0.3 EDA
G: 2 Hylene W:1.4 TDG:0.4 PEG 1000:0.2 EDA
H: 2 Hylene W:1.4 TDG:0.4 PEG 1000:0.2 EG
I: 2 Hylene W:1.7 DEG:0.3 PEG 1000
J: 2 Hylene W:1.75 DEG:0.25 PEG 1000
K: 2 Hylene W:1.7 DEG:0.3 PEG 2000
L: 2 Hylene W:1.8 DEG:0.2 PEG 2000

*DEG+TDG added simultaneously to Hylene W.

Abbreviations

EG = ethylene glycol
DEG = diethylene glycol
TDG = thiodiglycol
EDA = ethylene diamine
PEG = polyethylene glycol

We claim:

1. A breathable non-porous polyurethane film consisting of a block copolymer consisting of a low molecular weight difunctional compound to provide hard segments in the film, a polyethylene glycol to provide soft segments in the film and a diisocyanate, the polyethylene glycol being present in the amount of from 25 to 45% by weight based on the total weight of the film forming constituents, and said polyethylene glycol having an average molecular weight not exceeding 2000.

2. A film as claimed in claim 1 produced by reacting a low molecular weight difunctional compound, with an excess of a diisocyanate to form a prepolymer and subsequently reacting the prepolymer with the stoichiometric amount of a polyethylene glycol, the low molecular weight difunctional compound being one which provides a hard segment in the film and the polyethylene glycol being one which provides a soft segment in the film.

3. A film as claimed in claim 1 produced by reacting a polyethylene glycol with an excess of a diisocyanate to form a prepolymer and subsequently reacting the prepolymer with the stoichiometric amount of a low molecular weight difunctional compound, the low molecular weight difunctional compound being one which provides a hard segment in the film and the polyethylene glycol being one which provides a soft segment in the film.

4. A film as claimed in claim 1 produced by mixing together the low molecular weight difunctional compound and the polyethylene glycol and the diisocyanate.

5. A film as claimed in claim 4, wherein the low molecular weight difunctional compound and the polyethylene glycol are of different reactivity.

6. A film as claimed in claim 1, wherein the low molecular weight difunctional compound has a molecular weight not exceeding 200.

7. A film as claimed in claim 1, wherein the low molecular weight difunctional compound is a diol, a diamine or dihydrazide.

8. A film as claimed in claim 1, wherein the hard segment is formed by reaction of excess diisocyanate with two or more low molecular weight difunctional compounds.

9. A film as claimed in claim 1, wherein the polyethylene glycol has an average molecular weight above 400.

10. A film as claimed in claim 1, wherein the polyethylene glycol has an average molecular weight not exceeding 1500.

11. A film as claimed in claim 10, wherein the polyethylene glycol has an average molecular weight of from 600 to 1000.

12. A film as claimed in claim 1, wherein the amount of polyethylene glycol present is from 30 to 40% by weight based on the total weight of the film forming constituents.

13. A film as claimed in claim 1, wherein the hard segment is formed from two or more low molecular weight difunctional compounds.

14. A film as claimed in claim 1, wherein the soft segment is formed from two or more polyethylene glycols of different molecular weight.

15. A film as claimed in claim 1, wherein the diisocyanate is 4,4'-diisocyanatodicyclohexylmethane.

16. A breathable non-porous polyurethane film consisting of a block copolymer consisting of a low molecular weight difunctional compound to provide hard segments in the film, a polyethylene glycol to provide soft segments in the film and a diisocyanate,
    said polyethylene glycol being present in the amount of from 25 to 45% by weight based on the total weight of the film forming constituents,
    said polyethylene glycol having an average molecular weight not exceeding 2000, and
    wherein said polyurethane polymer is cross linked.

17. A film as claimed in claim 16, wherein cross linking is effected by addition of a cross linking agent to a solution of the polymer before casting the film.

18. A film as claimed in claim 17 wherein the cross linking agent is a triisocyanate.

19. Fabric consisting of a breathable film as claimed in claim 1.

20. Fabric coated with a breathable film as claimed in claim 1.

21. A process for preparing a fabric consisting of a breathable non-porous polyurethane film comprising
    reacting a reaction mixture consisting of a diisocyanate, a low molecular weight difunctional compound to provide hard segments in said film, and a polyethylene glycol having an average molecular weight not exceeding 2000 to provide soft segments in said film, said polyethylene glycol being present in the amount of from 25 to 45% by weight based on the total weight of the reaction mixture, to produce a breathable non-porous polyurethane film block copolymer, and
    forming said block copolymer into a fabric consisting of said breathable non-porous polyurethane film.

22. A process as claimed in claim 21, further comprising cross linking said polyurethane polymer.

23. A process for preparing a fabric coated with a breathable non-porous polyurethane film comprising
    reacting a reaction mixture consisting of a diisocyanate, a low molecular weight difunctional compound to provide hard segments in said film, and a polyethylene glycol having an average molecular weight not exceeding 2000 to provide soft segments in said film, said polyethylene glycol being present in the amount of from 25 to 45% by weight based on the total weight of the reaction mixture, to produce a breathable non-porous polyurethane film block copolymer, and
    coating a fabric with said block copolymer to produce said fabric coated with said breathable non-porous polyurethane film.

24. A process as claimed in claim 23, further comprising cross linking said polyurethane polymer.

* * * * *